United States Patent
Kannwischer

(10) Patent No.: US 11,801,562 B2
(45) Date of Patent: Oct. 31, 2023

(54) TOOL FOR MACHINING A WORKPIECE

(71) Applicant: Hartmetall-Werkzeugfabrik Paul Horn GmbH, Tuebingen (DE)

(72) Inventor: Markus Kannwischer, Ergenzingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 71 days.

(21) Appl. No.: 16/860,305

(22) Filed: Apr. 28, 2020

(65) Prior Publication Data

US 2020/0254531 A1 Aug. 13, 2020

Related U.S. Application Data

(63) Continuation of application No. PCT/EP2018/082408, filed on Nov. 23, 2018.

(30) Foreign Application Priority Data

Nov. 24, 2017 (DE) ..................... 10 2017 127 814.1

(51) Int. Cl.
 *B23C 5/22* (2006.01)
 *B23B 31/11* (2006.01)
 *B23C 5/10* (2006.01)

(52) U.S. Cl.
 CPC ............ *B23B 31/1122* (2013.01); *B23C 5/10* (2013.01); *B23C 5/22* (2013.01); *B23C 2210/02* (2013.01);
 (Continued)

(58) Field of Classification Search
 CPC .......... B23C 2240/32; B23C 2240/245; B23C 2240/24; B23C 2240/08; B23C 2240/16;
 (Continued)

(56) References Cited

U.S. PATENT DOCUMENTS 6,494,648 B2 12/2002 Harpaz
6,637,985 B2 10/2003 Pokolm
(Continued)

FOREIGN PATENT DOCUMENTS

AT        15013 U1 * 9/2016 ......... B23B 31/1122
CN    1427752 A     7/2003
(Continued)

OTHER PUBLICATIONS

English translation of DE 10114240 (Year: 2003).*
(Continued)

*Primary Examiner* — Alan Snyder
(74) *Attorney, Agent, or Firm* — Jason H. Vick; Sheridan Ross, PC

(57) ABSTRACT

The present invention relates to a tool (10) for machining a workpiece, comprising a cutting head (12) which comprises a sleeve (16) and a cutting element (18) which is fixed to the sleeve (16), and comprising a holder (14) to which the cutting head (12) can be detachably fixed. In an assembled state of the tool (10), the cutting head (12) and holder (14) are screwed to each other via an internal thread (40) which is arranged in the sleeve (16) and an external thread (42) which corresponds thereto and which is arranged on the holder (14). In addition, in the assembled state of the tool (10), the cutting head (12) and holder (14) contact each other along a first axial bearing surface (36) which is arranged on the sleeve (16) and a second axial bearing surface (38) which corresponds thereto and which is arranged on the holder (14), and along a first conical bearing surface (44) which is arranged on the sleeve (16) and a second conical bearing surface (46) which corresponds thereto and which is arranged on the holder (14).

16 Claims, 7 Drawing Sheets

(52) U.S. Cl.
CPC ...... *B23C 2240/32* (2013.01); *B23C 2250/12* (2013.01); *B23D 2277/02* (2013.01)

(58) Field of Classification Search
CPC ... B23C 5/28; B23B 2240/24; B23B 2240/08; B23B 51/06
See application file for complete search history.

(56) References Cited

U.S. PATENT DOCUMENTS

| | | |
|---|---|---|
| 6,811,360 B1 | 11/2004 | Scherbarth |
| 8,534,963 B2 | 9/2013 | Luik |
| 9,643,264 B2 | 5/2017 | Frota De Souza et al. |
| 9,827,619 B2 | 11/2017 | Shuffenahuer et al. |
| 10,124,421 B2 | 11/2018 | Leirer et al. |
| 2001/0041089 A1 | 11/2001 | Hecht |
| 2008/0304923 A1 | 12/2008 | Lehto et al. |
| 2011/0025051 A1 | 2/2011 | Yamaguchi et al. |
| 2011/0123282 A1 | 5/2011 | Luik |
| 2012/0093602 A1 | 4/2012 | Osawa et al. |
| 2012/0219375 A1 | 8/2012 | Hobohm et al. |
| 2013/0028669 A1 | 1/2013 | Cigni |
| 2013/0051935 A1 | 2/2013 | Schuffenhauer et al. |
| 2015/0202690 A1* | 7/2015 | Haimer ............... B23B 31/1115 279/99 |
| 2017/0043410 A1 | 2/2017 | Hecht |
| 2017/0266738 A1* | 9/2017 | Guy ........................ B23C 5/109 |

FOREIGN PATENT DOCUMENTS

| | | | |
|---|---|---|---|
| CN | 102649179 A | | 8/2012 |
| DE | 19945360 A1 | | 3/2001 |
| DE | 19956592 A1 | | 6/2001 |
| DE | 10114240 A1 | | 1/2003 |
| DE | 10157787 A1 | | 6/2003 |
| DE | 102010004526 A1 | | 7/2011 |
| DE | 102014107745 A1 | | 1/2015 |
| DE | 102013111596 A1 | | 6/2015 |
| DE | 202015106360 U1 | | 11/2015 |
| DE | 102015010399 A1 | | 3/2017 |
| EP | 1239989 B1 | | 10/2003 |
| EP | 2184124 A1 | | 5/2010 |
| EP | 3170598 A1 | | 5/2017 |
| JP | H06-213378 A | | 8/1994 |
| JP | H10-249627 A | | 9/1998 |
| JP | 2003-501279 A | | 1/2003 |
| JP | 2003-532844 A | | 11/2003 |
| JP | 2005-034939 A | | 2/2005 |
| JP | 2011-501075 A | | 1/2011 |
| JP | 2012-176485 A | | 9/2012 |
| RU | 2262419 C2 | | 10/2005 |
| SU | 319414 A1 | | 10/1972 |
| SU | 694292 A1 | | 10/1979 |
| WO | WO 01/85371 A | | 11/2001 |
| WO | WO 2010/012367 | | 2/2010 |
| WO | WO 2017/020051 | | 2/2017 |
| WO | WO 2017/025947 A1 | | 2/2017 |

OTHER PUBLICATIONS

Decision to Grant a Patent for an Invention (Including Translation) for corresponding Russian Application No. 2020113917/05(023403), dated Oct. 29, 2020.
Notification of Reasons for Rejection (Including Translation) for corresponding Japanese Patent Application No. 2020-528218, dated Aug. 3, 2021.
International Preliminary Report on Patentability for International Application No. PCT/EP2018/082408, dated Jun. 4, 2020.
International Search Report for International Application No. PCT/EP2018/082408, dated Mar. 11, 2019.
Written Opinion for International Application No. PCT/EP2018/082408, dated Mar. 11, 2019.
Notification of Reasons for Rejection (Including Translation) for corresponding Japanese Patent Application No. 2020-528218, dated Mar. 15, 2022.
First Office Action (Including Translation) for corresponding Chinese Patent Application No. 201880075532.8, dated Jul. 27, 2022.
Notification of Reasons for Rejection (Including Translation) for corresponding Japanese Patent Application No. 2020-528218, dated Sep. 13, 2022.

* cited by examiner

TOOL FOR MACHINING A WORKPIECE

CROSS REFERENCE TO RELATED APPLICATIONS

This application is a continuation of international patent application PCT/EP2018/082408, filed on Nov. 23, 2018 designating the U.S., which international patent application has been published in German language and claims priority from German patent application DE 10 2017 127 814.1, filed on Nov. 24, 2017. The entire contents of these priority applications are incorporated herein by reference.

BACKGROUND OF THE INVENTION

This disclosure relates to a tool for machining a workpiece. The tool comprises a cutting head having a sleeve and a cutting element which is fixed to the sleeve and on which at least one cutting edge is arranged. The cutting head extends along a first longitudinal axis. The tool also comprises a holder to which the cutting head can be detachably fixed. The holder extends along a second longitudinal axis.

Whilst the tool generally relates to all types of tools for machining a workpiece, the tool relates, in particular, to a milling tool, preferably to a ball raceway milling device.

An exemplary milling tool is disclosed in WO 2010/012367 A1.

When milling joint pins and joint hubs generally specific tools, so-called ball raceway milling devices, are used. These ball raceway milling devices cut on the front face at different engagement widths and machining depths, to this end the ball raceway milling device normally being set at an angle of, for example, 20°. In some cases, the raceways correspond to cylindrical cutouts but in some cases the raceways are curved, which requires tools which are very flexurally stiff. The milling is carried out both in soft and in hardened materials. Depending on the application, currently different types of tool are used.

Exemplary ball raceway milling devices are disclosed in DE 199 56 592 A1 and DE 199 45 360 A1.

A particular requirement in the construction of ball raceway milling devices is to provide an interface between the holder and the cutting head which comprises a corresponding stiffness in order to absorb forces which are present during the machining. Due to the angled setting of the ball raceway milling device, the interface between the holder and the cutting head in such tools is subjected to high flexural stress. Thus the interface has to be capable of absorbing this flexural stress without having to suffer losses relative to the accuracy of the tool.

The international patent application WO 2010/012367 A1 already cited in the introduction discloses a plurality of suitable interface solutions which satisfy the aforementioned requirements for ball raceway milling devices. Nevertheless, there is still room for improvement of this interface.

SUMMARY OF THE INVENTION

It is an object to provide a tool which overcomes the above-mentioned deficiencies. It is particularly an object to improve the interface between the holder and the cutting head of the tool such that a more stable and a more accurate positioning of the cutting head is possible.

According to an aspect, a tool for machining a workpiece is presented, the tool comprising:
 a cutting head having a sleeve and a cutting element, wherein the cutting element is fixed to the sleeve and comprises at least one cutting edge, and wherein the cutting head extends along a first longitudinal axis; and
 a holder to which the cutting head can be detachably fixed, wherein the holder extends along a second longitudinal axis;
 wherein the sleeve comprises a first axial bearing surface which at least partially surrounds the first longitudinal axis and runs orthogonally to the first longitudinal axis, wherein the sleeve comprises a first conical bearing surface which at least partially surrounds the first longitudinal axis and runs symmetrically to the first longitudinal axis, and wherein an internal thread is arranged in a first region inside the sleeve, said region extending along the first longitudinal axis between the first axial bearing surface and the first conical bearing surface,
 wherein the holder comprises a second bearing surface which at least partially surrounds the second longitudinal axis and runs orthogonally to the second longitudinal axis, wherein the holder comprises a second conical bearing surface which at least partially surrounds the second longitudinal axis and runs symmetrically to the second longitudinal axis, and wherein an external thread is arranged in a second region on the holder, said second region extending along the second longitudinal axis between the second axial bearing surface and the second conical bearing surface, and
 wherein, in an assembled state of the tool, the internal thread is screwed to the external thread, the first longitudinal axis coincides with the second longitudinal axis, the first axial bearing surface bears against the second axial bearing surface and the first conical bearing surface bears against the second conical bearing surface.

The cutting head is screwed to the holder. The positioning of the cutting head and/or the sleeve of the cutting head is established via two corresponding conical surfaces and two corresponding planar surfaces.

The conical surfaces in the present case are denoted as the first and second conical bearing surfaces, wherein the first conical bearing surface is arranged on the cutting head and the second conical bearing surface is arranged on the holder.

The planar surfaces in the present case are denoted as the first and second axial bearing surfaces, wherein the first axial bearing surface is arranged on the cutting head and the second axial bearing surface is arranged on the holder.

The supporting bearing surfaces, i.e. the conical and axial bearing surfaces, are in each case arranged on different sides of the internal and external thread so that the cutting head and the holder bear against one another on one side of the thread along the axial bearing surfaces and bear against one another on the other side of the thread along the conical bearing surfaces.

This type of interface ensures an extremely stable support and at the same time a very accurate positioning. The axial bearing surfaces absorb forces merely in the axial direction. However, the conical bearing surfaces serve at the same time for improved centering of the cutting head and absorb forces both in the axial and in the radial direction.

The use of conical bearing surfaces in addition to the axial bearing surfaces provides clear advantages. Conical bearing surfaces have the advantage, in particular relative to cylindrical bearing surfaces, of improved centering of the cutting head, since production tolerances are reduced in the direction orthogonally to the longitudinal axis during the continuing screwing-in process. Moreover, the conical surfaces may be brought together in an improved manner in the direction of the longitudinal axis since contact is produced between the conical outer surfaces only during the final positioning. Thus the conical outer surfaces would become worn to a far lesser extent than would be the case for the cylindrical outer surfaces at this point. A further advantage is in the larger surface area of the cone envelope of the conical bearing surfaces relative to a cylinder envelope of cylindrical bearing surfaces, whereby the percentage bearing area of the conical bearing surfaces is increased.

Preferably, in an assembled state of the tool, the cutting head and holder exclusively contact each other along the internal and/or external thread and along the axial and conical bearing surfaces. According to a refinement, further bearing surfaces or contact points do not exist.

According to a further refinement, the first axial bearing surface is arranged on a front face of the sleeve and the first conical bearing surface is arranged in an interior of the sleeve.

The first conical bearing surface is, as a result, well protected from damage. This is advantageous, in particular, for an accurate positioning of the sleeve relative to the holder.

According to a further refinement, a chamfer which is adjacent to the second conical bearing surface is arranged on a front face of the holder.

This refinement has the advantage that the first conical bearing surface is not damaged when the holder is inserted into the cutting head. The chamfer arranged on the holder serves as an insertion chamfer.

According to a further refinement, a radius is arranged on the holder between the external thread and the second axial bearing surface.

This radius serves as a transition radius between the external thread and the second axial bearing surface and has the advantage, in particular, that the notch strength is increased thereby.

According to a further refinement, the holder comprises a shaft on which the external thread is arranged, wherein the shaft is at least partially made of hard metal, and wherein the sleeve is at least partially made of steel.

The production of the holder shaft from hard metal ensures a high level of stiffness and stability of the shaft which is of great advantage, in particular, in the case of ball raceway milling. Thus in comparison with a holder made of steel, the shaft made of hard metal has a relatively long service life.

The holder further comprises a shaft holder in which the shaft may be detachably fixed, wherein the shaft holder is at least partially made of steel. Thus in each case a transition from hard metal to steel and/or steel to hard metal is produced at the respective interfaces of the tool, which in turn is advantageous for reasons of stability.

The cutting element is preferably made of hard metal, cubic boron nitride (CBN) or polycrystalline diamond (PCD). The sleeve and the cutting element are preferably soldered together. In principle, however, other types of connection may also be considered, for example screw connections.

According to a further refinement, the first conical bearing surface is inclined at a first inclination angle relative to the first longitudinal axis. The second conical bearing surface is inclined at a second inclination angle relative to the second longitudinal axis, wherein the first and the second inclination angle are of the same size.

The inclination angles correspond, therefore, to half of the opening angle of the respective cone. The two inclination angles preferably range from 10°-45°, particularly preferably range from 15°-30°.

According to a further refinement, each of the internal thread and the external thread is configured as an acme thread.

Acme threads are very stable and are suitable for transmitting high forces.

Preferably, each of the internal thread and the external thread comprises at least two thread pitches.

According to a further refinement, a coolant channel running along the second longitudinal axis is arranged in the holder. A plurality of distribution channels are arranged in the sleeve, said distribution channels feeding into a cavity which is arranged in the sleeve and which, in an assembled state of the tool, corresponds to the coolant channel.

This permits the supply of coolant and lubricant directly, or at least very close, to the cutting region. The cavity in the sleeve serves for distributing the coolant and lubricant inside the sleeve to the individual distribution channels.

According to a further refinement, a planar surface, which is oriented parallel to the first longitudinal axis, is arranged on an outer surface of the sleeve.

This planar surface serves as an engagement surface and/or clamping surface for a tool wrench for mounting the cutting head on the holder.

It goes without saying that the aforementioned features to be described further hereinafter may be used not only in the respectively specified combination but also in other combinations or individually without departing from the spirit and scope of the present disclosure.

DESCRIPTION OF PREFERRED EMBODIMENTS

Figure 1:
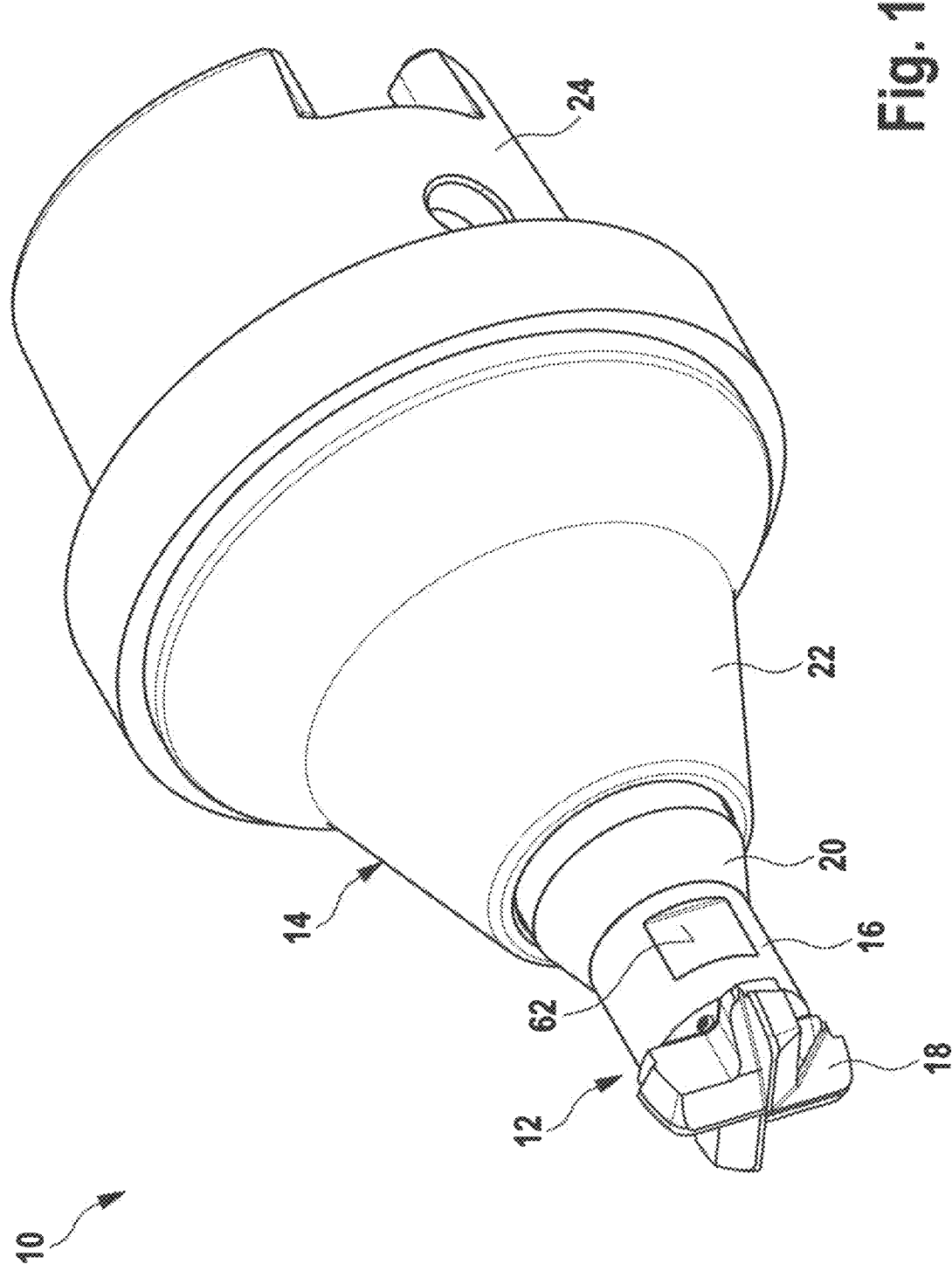
FIG. 1 shows a perspective view of an exemplary embodiment of the tool.
Figure 2:
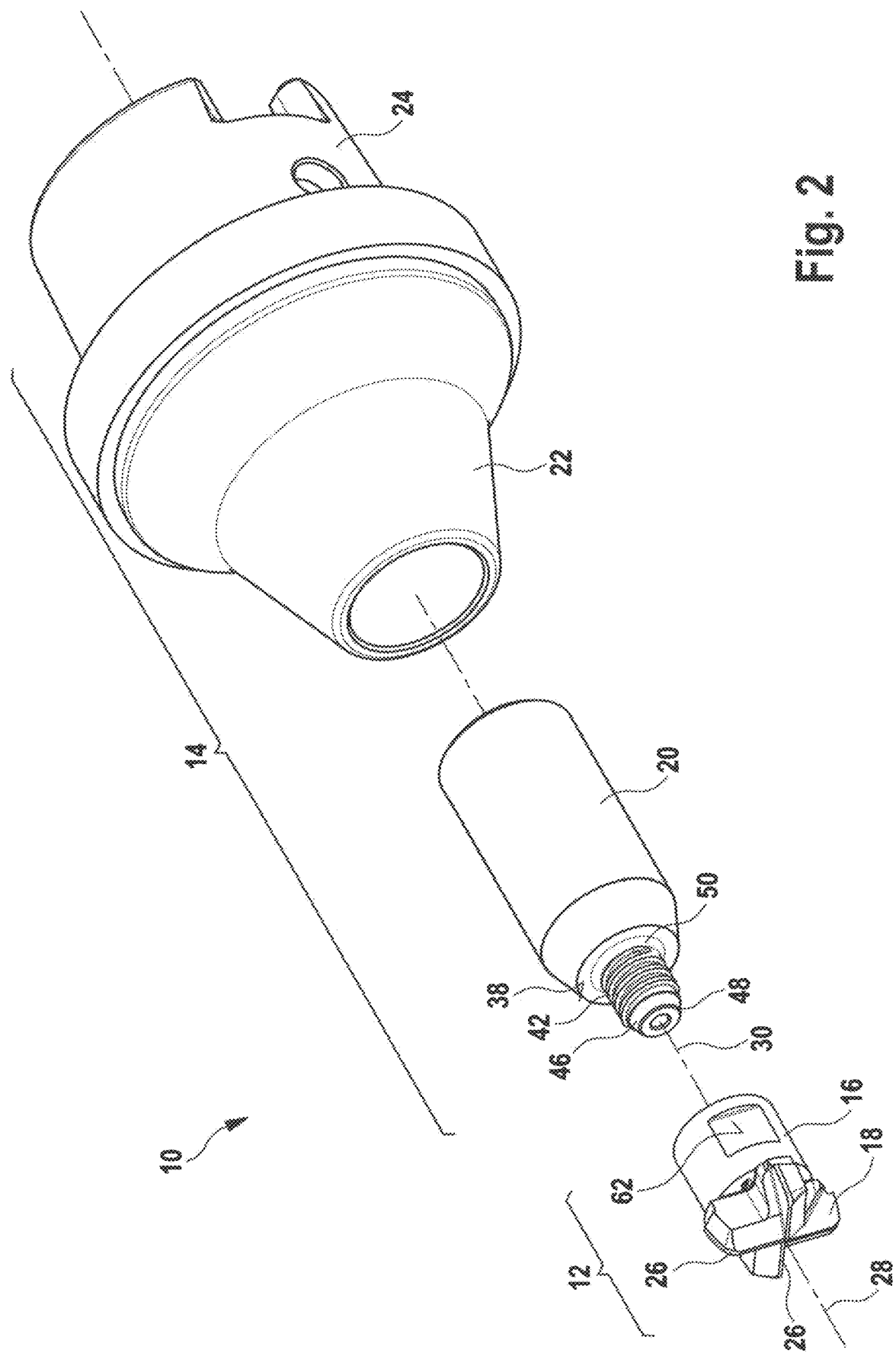
FIG. 2 shows an exploded view of the tool shown in FIG. 1.
Figure 3:
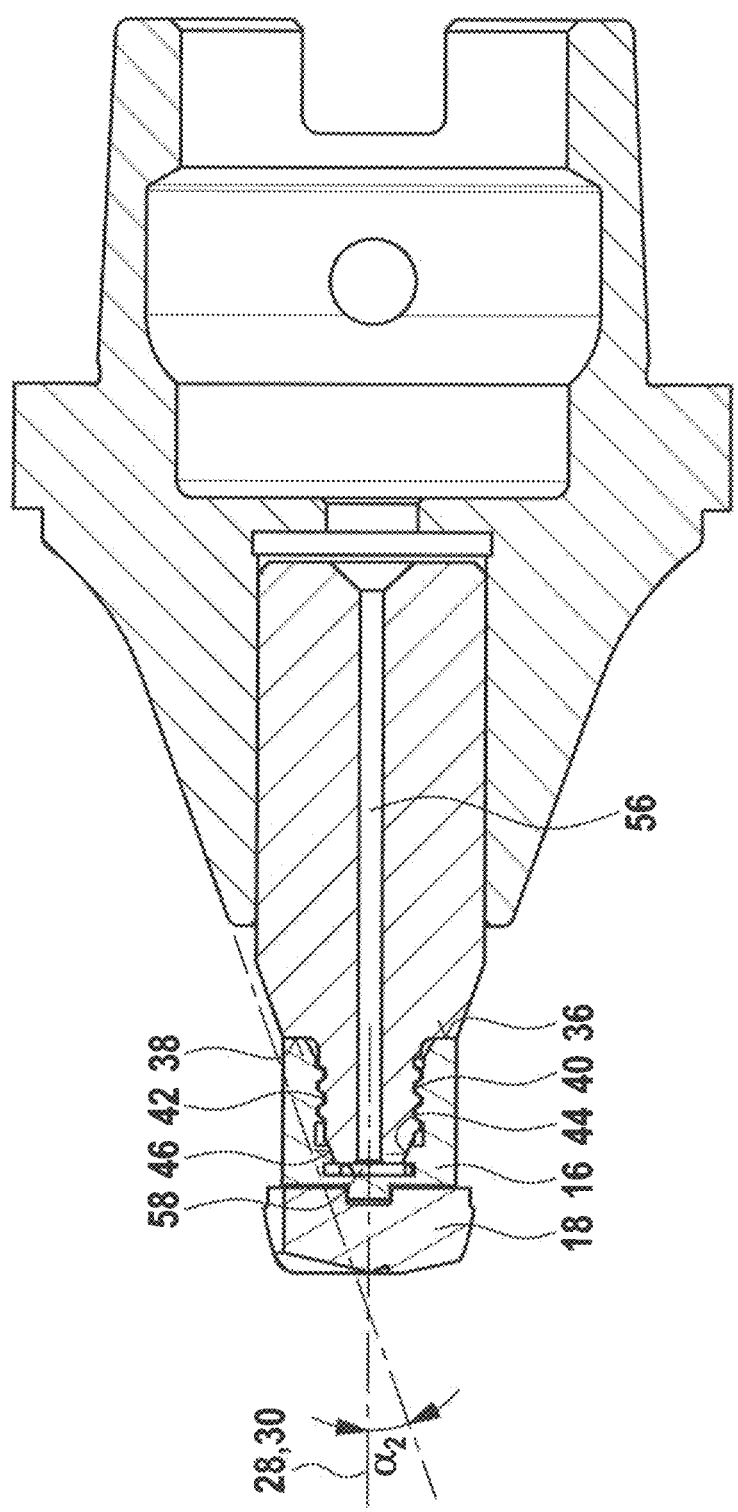
FIG. 3 shows a sectional view of the tool shown in FIG. 1.
Figure 4:
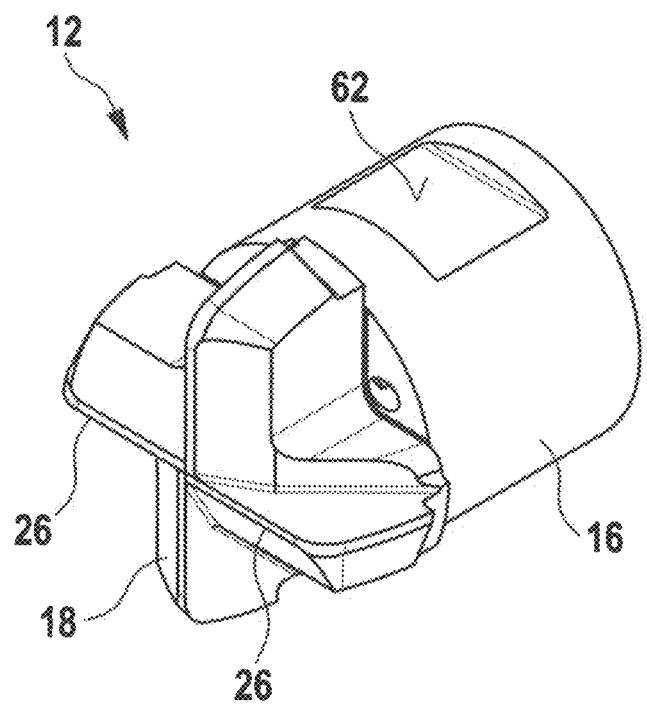
FIG. 4 shows a perspective view of a cutting head of the tool shown in FIG. 1.
Figure 5:
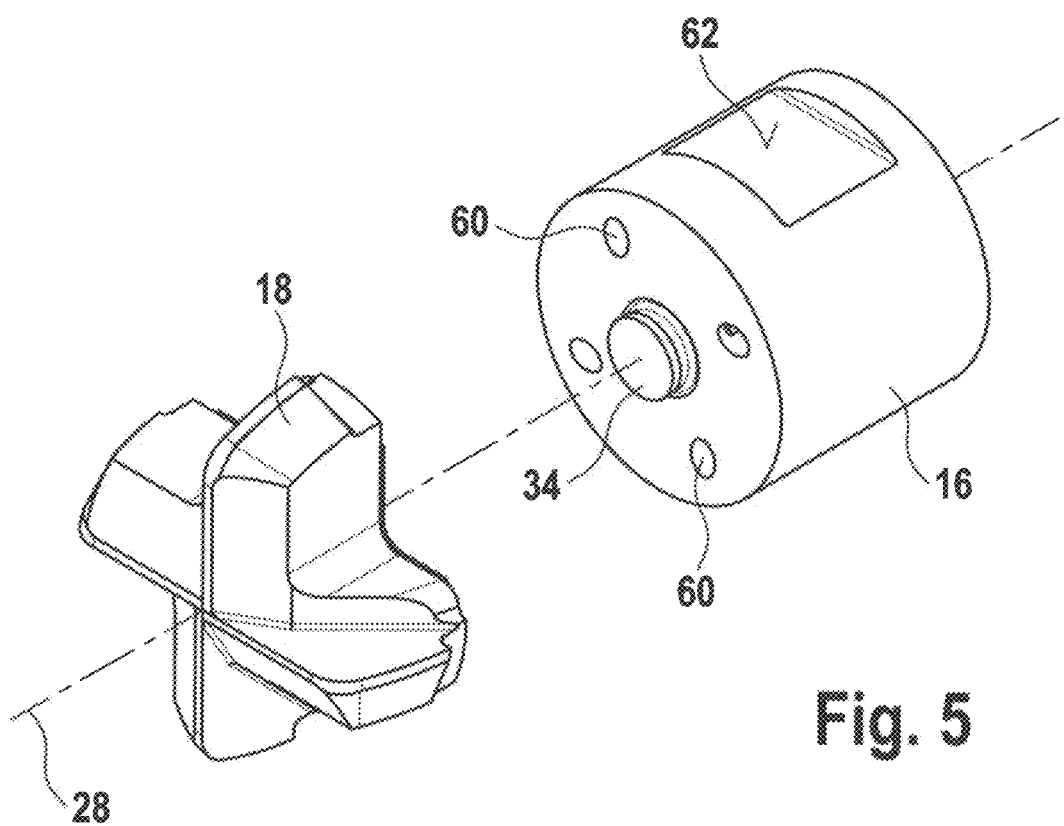
FIG. 5 shows an exploded view of the cutting head shown in FIG. 4.
Figure 6:
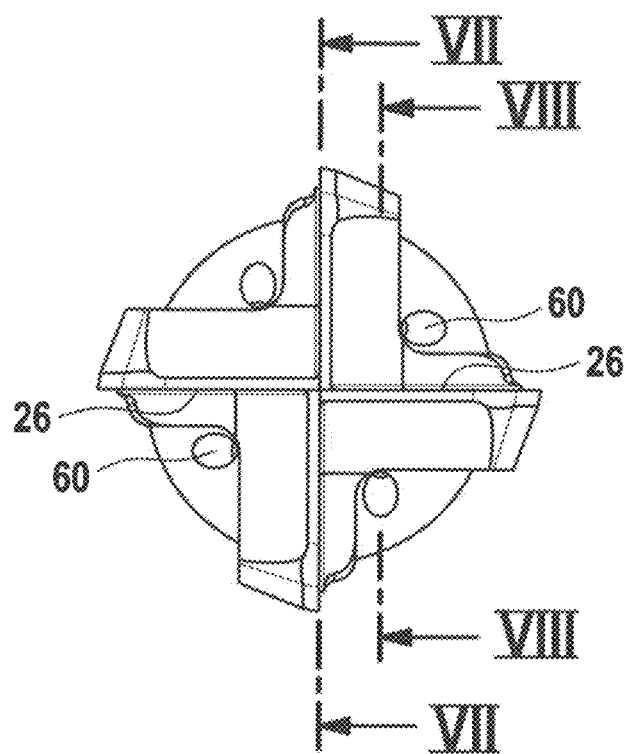
FIG. 6 shows a plan view from the front of the cutting head shown in FIG. 4.

FIGS. 1-3 show a first exemplary embodiment of the tool in the assembled state (FIG. 1), in the dismantled state (FIG. 2) and in a sectional view (FIG. 3). The tool is denoted in each case in its entirety by the reference numeral 10.

The tool 10 is designed as a ball raceway milling device. The tool 10 includes a cutting head 12 and a holder 14 in which the cutting head 12 is detachably fixed. The cutting head 12 comprises a sleeve 16 and a cutting element 18 fixed to the sleeve 16.

The holder 14 comprises a shaft 20 and a shaft holder 22 in which the shaft 20 is detachably fixed. The shaft holder 22 comprises at its rear end a tool interface 24 by means of which the tool 10 is clampable in a machine tool (not shown).

The sleeve 16 of the cutting head 12 is screwed to the shaft 20 of the holder 14. The shaft 20 is fixed in a rotationally fixed manner in the shaft holder 22. Preferably, the shaft 20 is shrink-fitted into the shaft holder 22. In principle, however, at this point a screw connection or a different type of rotationally fixed connection might also be conceivable.

The cutting head 12 extends substantially along a first longitudinal axis 28. The holder 14 extends substantially along a second longitudinal axis 30. Both longitudinal axes 28, 30 coincide when the tool 10 is assembled.

The individual components of the tool 10 are preferably produced in an alternate sequence from hard metal and steel. The cutting element 18 is preferably made of hard metal. The sleeve 16 is preferably made of steel. The shaft 20 is preferably made of hard metal. The shaft holder 22 is preferably made of steel.

Figure 7:
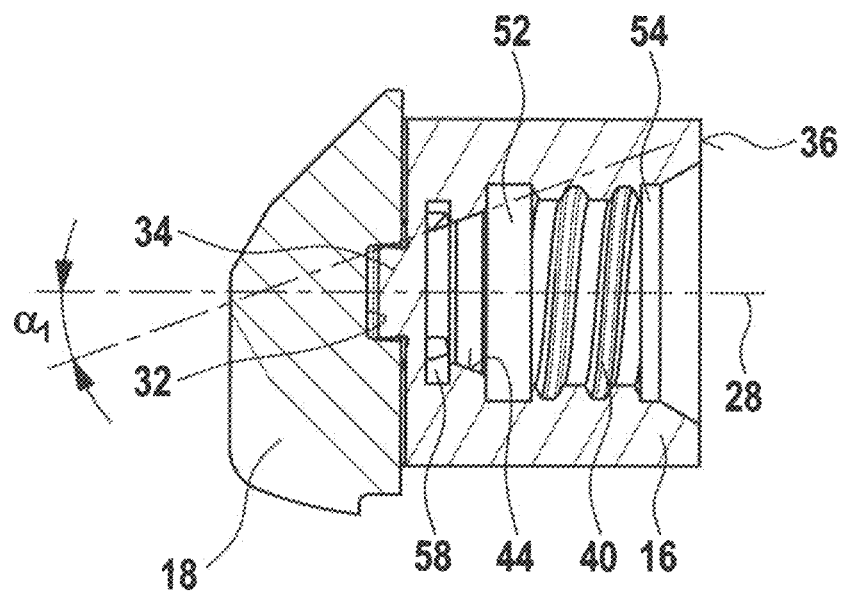
FIG. 7 shows a first sectional view of the cutting head shown in FIG. 6.

The sleeve 16 and the cutting head 18 are soldered together. Preferably, the cutting element 18 is butt-soldered onto the sleeve 16 by means of hard solder. A bore 32 arranged centrally in the cutting element 18 (see FIG. 7) and a pin 34 corresponding thereto which is arranged on the sleeve 16 serve for assisting the positioning during the soldering process. However, it should be mentioned that other types of connection are also possible between the sleeve 16 and the cutting element 18, for example a screw connection.

The connection between the cutting head 12 and holder 14, more specifically the connection between the sleeve 16 and the shaft 20, is an extremely stable, flexurally stiff and very accurately positioned connection. The sleeve 16 comprises a first axial bearing surface 36 which corresponds to a second axial bearing surface 38 which is arranged on the shaft 20. Additionally, the sleeve 16 comprises an internal thread 40 which corresponds to a corresponding external thread 42 which is arranged on the shaft 20. Moreover, the sleeve 16 comprises a first conical bearing surface 44 which corresponds to a second conical bearing surface 46 which is arranged on the shaft 20.

Preferably, in the assembled state of the tool 10, the cutting head 12 and sleeve 20 merely contact each other along the internal and/or external thread 40, 42 and along the axial and conical bearing surfaces 36, 38 and 44, 46. Forces acting in the peripheral direction are absorbed by the internal thread 40 and the external thread 42. Axial forces are absorbed both via the conical bearing surfaces 44, 46 and via the axial bearing surfaces 36, 38. The conical bearing surfaces 44, 46 due to their oblique position additionally absorb forces in the radial direction. The conical bearing surfaces 44, 46, in addition to stable support, also serve for accurate positioning of the cutting head 12 relative to the shaft 20.

The first axial bearing surface 36 is arranged on the lower front face of the sleeve 16 and runs orthogonally to the first longitudinal axis 28 of the cutting head 12. The first axial bearing surface 36 is preferably designed as an annular surface.

The second axial bearing surface 38 is arranged on the upper face of the shaft 20 and runs orthogonally to the second longitudinal axis 30 of the holder 14. The second axial bearing surface 38 is preferably also designed as an annular surface.

The first conical bearing surface 44 is arranged in the interior of the sleeve 16 and runs transversely, i.e. not parallel, to the first longitudinal axis 28 of the cutting head 12. The first conical bearing surface 44 is preferably inclined at a first inclination angle $\alpha_1$ relative to the first longitudinal axis 28 (see FIG. 7). This inclination angle $\alpha_1$ corresponds to half of the opening angle of the cone, the first conical bearing surface 44 being located on the outer surface thereof. The first inclination angle $\alpha_1$ preferably ranges from 10°-45°, particularly preferably ranges from 15°-30°. The first conical bearing surface 44 surrounds the first longitudinal axis 28, preferably entirely.

The second conical bearing surface 46 is arranged on the upper front face of the shaft 20 and at a second inclination angle $\alpha_2$ which is inclined by the same amount as the first inclination angle $\alpha_1$ relative to the second longitudinal axis 30 of the holder 14. The internal thread 40 provided in the interior of the sleeve 16 is arranged in a region which is located between the first axial bearing surface 36 and the first conical bearing surface 44. Similarly, the external thread 42 arranged on the shaft 20 is also arranged in a region which is located between the second axial bearing surface 38 and the second conical bearing surface 46.

The fact that the internal thread 40 is arranged in a region between the first axial bearing surface 36 and the first conical bearing surface 44 does not imply, however, that the internal thread 40 at its two ends is directly adjacent to the first axial bearing surface 36 and the first conical bearing surface 44. This may be the case, but does not have to be the case. In each case, an undercut or a clear spacing may also be provided therebetween.

Similarly, the second axial bearing surface 38 and the second conical bearing surface 46 may be directly adjacent to the two opposing ends of the external thread 42 but they do not have to be. An undercut or a clear spacing may also be provided therebetween in each case.

The internal thread 40 and the external thread 42 are preferably designed as an acme thread with at least two thread pitches in each case.

A chamfer 48 is arranged above the second conical bearing surface 46 on the shaft 20, said chamfer being designed to prevent damage to the first conical bearing surface 44 when the shaft 20 is inserted into the sleeve 16. The second conical bearing surface 46 is thus arranged between this chamfer 48 and the external thread 42. At the lower end of the external thread 42, i.e. between the external thread 42 and the second axial bearing surface 38, a transition radius 50 is arranged (see FIG. 2). This transition radius 50 serves for improving the notch strength.

Figure 8:
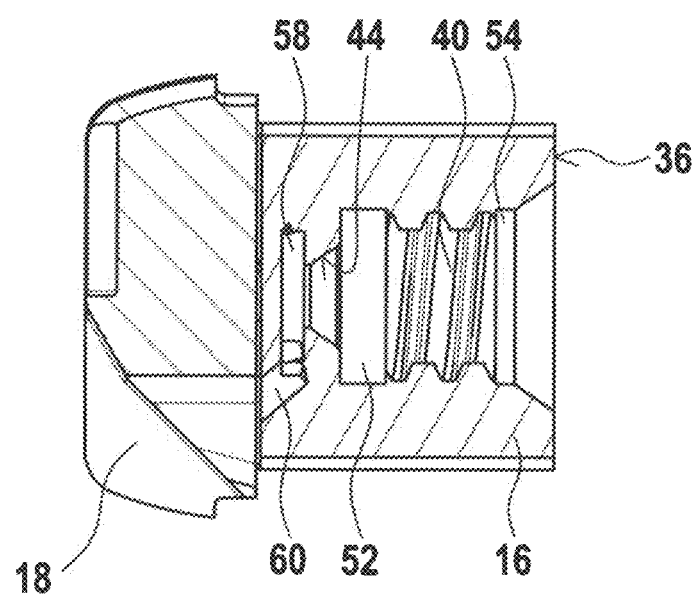
FIG. 8 shows a second sectional view of the cutting head shown in FIG. 6.

As is also visible from FIG. 8, the internal thread 40 is not directly adjacent to the first conical bearing surface 44. An internal undercut 52 is arranged between the internal thread 40 and the first conical bearing surface 44. An internal undercut 54 is also arranged at the opposing end of the internal thread 40.

The tool 10 also comprises a coolant channel 56 which runs in the interior of the holder 14. The coolant channel 56 extends, amongst other things, in the interior of the shaft 20 along the longitudinal axis 30. On the upper face of the shaft 20 the coolant channel 56 feeds into a cavity 58 in the interior of the sleeve 16. From this cavity 58 the coolant and lubricant are divided between a plurality of distribution channels 60 which are located in the interior of the sleeve 16 and exit at the upper face thereof from the sleeve 16.

A planar surface 62 is also provided on the outer face of the sleeve 16, said planar surface serving as an engagement surface for an open-end wrench for mounting the cutting head 12. This planar surface 62 preferably runs parallel to the first longitudinal axis 28 of the cutting head 12.

Figure 9:
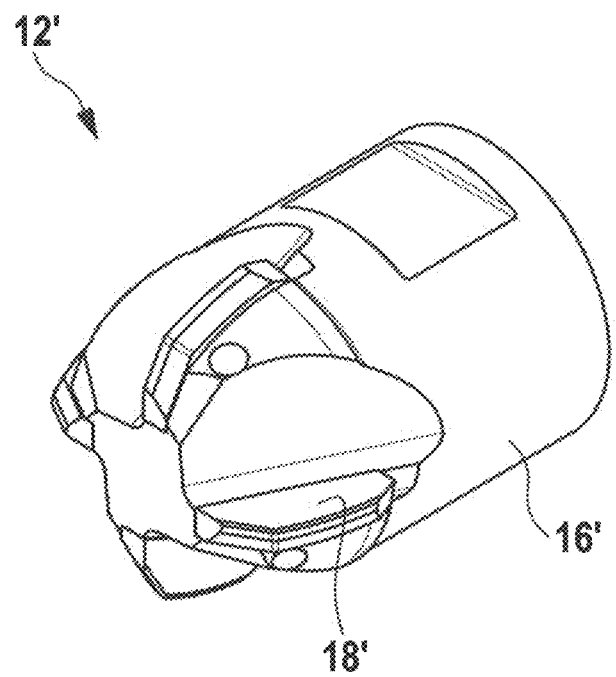
FIG. 9 shows a perspective view of a cutting head according to a second exemplary embodiment.
Figure 10:
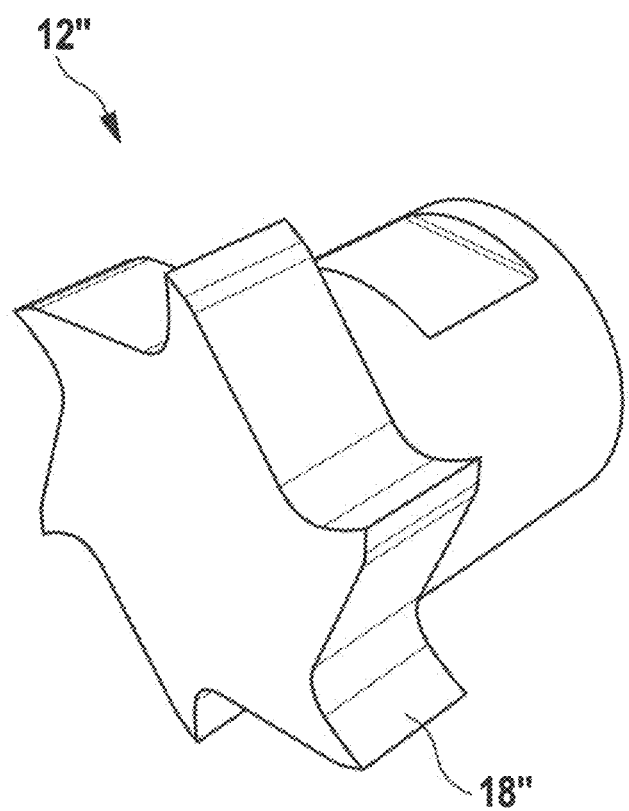
FIG. 10 shows a perspective view of a cutting head according to a third exemplary embodiment.

FIGS. 9 and 10 show further possible exemplary embodiments of cutting heads 12', 12". These cutting heads substantially differ from the cutting head 12 according to the first exemplary embodiment, in terms of the geometry of the cutting edges. For example, the cutting bodies 18' shown in FIG. 9 are plate-shaped cutting bodies which are made of CBN and which are individually soldered onto the sleeve 16'. The cutting element 18" shown in FIG. 10 is, for example, suitable for a milling tool for slot milling.

The internal construction and the interface between the sleeve 16 and the shaft 20 do not differ, however, in the exemplary embodiments shown in FIGS. 9 and 10, or only slightly, from the first exemplary embodiment shown in FIGS. 1-8, which is why embodiments which relate thereto are not repeated further at this point.

What is claimed is:

1. A tool configured to machine a workpiece, comprising:
   a cutting head having a sleeve and a cutting element, wherein the cutting element is fixed to the sleeve and comprises at least one cutting edge, and wherein the cutting head extends along a first longitudinal axis; and
   a holder to which the cutting head can be detachably fixed, wherein the holder extends along a second longitudinal axis;
   wherein the sleeve comprises a first axial bearing surface which is an annular surface that at least partially surrounds the first longitudinal axis and runs orthogonally to the first longitudinal axis, wherein the sleeve comprises a first conical bearing surface which at least partially surrounds the first longitudinal axis and runs symmetrically to the first longitudinal axis, and wherein an internal thread is arranged in a first region inside the sleeve, said region extending along the first longitudinal axis between the first axial bearing surface and the first conical bearing surface,
   wherein the holder comprises a second axial bearing surface which is an annular surface that at least partially surrounds the second longitudinal axis and runs orthogonally to the second longitudinal axis, wherein the holder comprises a second conical bearing surface which at least partially surrounds the second longitudinal axis and runs symmetrically to the second longitudinal axis, and wherein an external thread is a straight thread and is arranged in a second region on the holder, said second region being cylindrical and extending along the second longitudinal axis between the second axial bearing surface and the second conical bearing surface, and
   wherein, in an assembled state of the tool, the internal thread is screwed to the external thread, the first longitudinal axis coincides with the second longitudinal axis, the first axial bearing surface bears against the second axial bearing surface and the first conical bearing surface bears against the second conical bearing surface,
   wherein the first conical bearing surface is inclined at a first inclination angle relative to the first longitudinal axis, and wherein the second conical bearing surface is inclined at a second inclination angle relative to the second longitudinal axis, wherein the first and the second inclination angle are equal,
   wherein $10° ≤ α1 = α2 ≤ 45°$, wherein $α1$ indicates the first inclination angle, and $α2$ indicates the second inclination angle.

2. The tool as claimed in claim 1, wherein the first axial bearing surface is arranged on a front face of the sleeve and wherein the first conical bearing surface is arranged in an interior of the sleeve.

3. The tool as claimed in claim 2, wherein an internal undercut is arranged in the interior of the sleeve between the first conical bearing surface and the internal thread.

4. The tool as claimed in claim 1, wherein a chamfer is arranged on a front face of the holder adjacent to the second conical bearing surface.

5. The tool as claimed in claim 1, wherein a radius is arranged on the holder between the external thread and the second axial bearing surface.

6. The tool as claimed in claim 1, wherein the holder comprises a shaft on which the external thread is arranged, wherein the shaft is at least partially made of cemented carbide, and wherein the sleeve is at least partially made of steel.

7. The tool as claimed in claim 6, wherein the holder comprises a shaft holder which is configured to receive the shaft, wherein the shaft holder is at least partially made of steel.

8. The tool as claimed in claim 1, wherein the sleeve and the cutting element are connected to one another by means of a soldered connection.

9. The tool as claimed in claim 1, wherein $15° ≤ α1 = α2 ≤ 30°$, wherein $α1$ indicates the first inclination angle, and $α2$ indicates the second inclination angle.

10. The tool as claimed in claim 1, wherein each of the internal thread and the external thread comprises an acme thread.

11. The tool as claimed in claim 1, wherein the internal thread and the external thread are complementary thread pitches.

12. The tool as claimed in claim 1, wherein the holder comprises a coolant channel running along the second longitudinal axis, and wherein the sleeve comprises a plurality of distribution channels, said distribution channels leading into a cavity which is arranged inside the sleeve, wherein, in the assembled state of the tool, said cavity is in fluidic communication with the coolant channel.

13. The tool as claimed in claim 1, wherein a planar surface, which is oriented parallel to the first longitudinal axis, is arranged on an outer surface of the sleeve.

14. The tool as claimed in claim 1, wherein the tool is a milling tool.

15. The tool as claimed in claim 1, wherein one of the cutting element and the sleeve comprises a central bore, and the other one of the cutting element and the sleeve comprises a pin which is inserted into the bore, and wherein the sleeve and the cutting element are connected to one another by means of a soldered connection.

16. The tool as claimed in claim 1, wherein the cutting element is made of cemented carbide, cubic boron nitride or polycrystalline diamond, and wherein the cutting element is soldered to the sleeve.

* * * * *